United States Patent
Hussein et al.

(10) Patent No.: US 6,181,502 B1
(45) Date of Patent: Jan. 30, 2001

(54) FASTER ACCESS TIME IN A DISK DRIVE BY UTILIZING INCREASED VCM POTENTIAL VOLTAGE

(75) Inventors: Hakam D. Hussein; Eric Gregory Oettinger; Michael C. Stich, all of Rochester, MN (US)

(73) Assignee: Western Digital Corporation, Irvine, CA (US)

( * ) Notice: Under 35 U.S.C. 154(b), the term of this patent shall be extended for 0 days.

(21) Appl. No.: 09/108,597

(22) Filed: Jul. 1, 1998

(51) Int. Cl.$^7$ ..................................... G11B 15/18
(52) U.S. Cl. ........................ 360/69; 360/75; 360/78.04
(58) Field of Search ................... 360/78.06, 75, 360/69, 78.04; 318/109, 105–106, 440, 442; 363/59, 60

(56) References Cited

U.S. PATENT DOCUMENTS

| | | |
|---|---|---|
| 4,991,129 * | 2/1991 | Swartz ................... 364/707 |
| 5,204,593 | 4/1993 | Ueki . |
| 5,208,518 | 5/1993 | Grapenthin et al. . |
| 5,495,372 | 2/1996 | Bahlmann et al. . |
| 5,504,402 | 4/1996 | Menegoli . |
| 5,566,369 | 10/1996 | Carobolante . |
| 5,592,353 | 1/1997 | Shinohara et al. . |
| 5,631,527 | 5/1997 | Canclini . |
| 5,737,144 | 4/1998 | Ataee et al. . |
| 6,008,690 * | 12/1999 | Takeshima et al. ............... 327/534 |
| 6,011,667 * | 1/2000 | Dunn et al. ..................... 360/69 |

* cited by examiner

*Primary Examiner*—Hoa T. Nguyen
*Assistant Examiner*—Dan I. Davidson
(74) *Attorney, Agent, or Firm*—Milad G. Shara (57) ABSTRACT

A disk drive includes a voice coil motor (VCM) and a VCM power source circuit which is coupled to a standard power supply having a fixed voltage. During seek operations the VCM power source circuit provides a boosted voltage, greater than the fixed supply voltage, for the VCM. The VCM power source circuit provides the boosted voltage independently from the back EMF generated in the voice coil motor. The increased VCM voltage allows faster access times and more efficient VCM operation.

24 Claims, 6 Drawing Sheets

FASTER ACCESS TIME IN A DISK DRIVE BY UTILIZING INCREASED VCM POTENTIAL VOLTAGE

BACKGROUND OF THE INVENTION

1. Field of the Invention

The present invention generally relates to reducing data access time in disk drives, and more particularly to an apparatus and method for reducing data access time during seek operations in disk drives by increasing a voltage supplied to a voice coil motor (VCM) of the disk drive.

2. Description of the Prior Art

In hard disk drives, data is stored on magnetic media disks in concentric data tracks, which are divided into groups of data sectors. Servo information including track number, sector number, and tracking information is recorded in radially continuous narrow wedges between the groups of data sectors. The disk drive includes an actuator assembly having a voice coil motor (VCM), an actuator arm extending from the VCM, and a transducer head disposed at the end of the actuator arm. One way of improving disk drive performance is to reduce data access time, including the time required to move the transducer head of the actuator assembly from a current data track to a selected target data track.

The disk drive performs a seek operation to move the transducer head from a present data track to a target data track. The disk drive includes a servo system employed to seek to the target data track and thereafter follow the target data track on the disk. The servo system controls the VCM so that the VCM swings the actuator and its attached transducer head to access the target data track. Therefore, if the torque developed ($T_d$) by the VCM could be increased, a corresponding reduction in data access time could be achieved. $T_d$ is given by the following Equations I:

Equations I $$T_d = Kt * I_{coil}$$

$$Kt = Ke (Kt \text{ in } Nm/A; Ke \text{ in } V/\text{rad/sec})$$

$$Bemf = Ke * Vel_{motor} (Vel_{motor} \text{ in rad/sec})$$

$$V_{applied} = V_{source} - Bemf = I_{coil} * R_{coil}$$

$$I_{coil} = (V_{source} - Ke * Vel_{motor}) / R_{coil}$$

Where:

$T_d$ is the torque developed by the VCM;

Kt is the Torque constant of the VCM;

$I_{coil}$ is VCM coil current;

Ke is the Voltage constant of the VCM i.e. the Bemf factor;

Bemf is the back emf of the VCM;

$Vel_{motor}$ is the velocity of the VCM;

$V_{applied}$ is the voltage applied to the VCM coil;

$V_{source}$ is the voltage of the VCM power source supplying power to the VCM; and $R_{coil}$ is the total resistance of the VCM coil from the VCM power source to ground As can be shown by Equations I above, $T_d$ can be increased by increasing Kt and/or $I_{coil}$. Unfortunately, increasing $I_{coil}$ causes a corresponding heating of the VCM coil, proportional to the square of the current, which can result in heat related breakdown of VCM components, including the VCM coil itself. In particular, seek operations require the highest current to be supplied to the VCM in order to achieve competitive access times. Conversely, increasing Kt equates to an equal increase in Ke which increases the Bemf of the VCM. Therefore, the Bemf approaches $V_{source}$ as Kt is increased. Consequently, if $V_{source}$ cannot be increased, less voltage $V_{applied}$ is available and $I_{coil}$ is reduced as Kt is increased thereby limiting the performance of the VCM. The $V_{source}$ supplied to the VCM in disk drives, however, is fixed because, for compatibility with host systems, a standard power supply having a fixed voltage is used to supply power to the VCM. This fixed voltage power supply to the VCM therefore limits how much effect the VCM can have on reducing access times.

For reasons stated above and for other reasons presented in greater detail in the detailed description of the present specification, there is a desire to reduce data access time during seek operations in disk drives. In particular, there is a need to improve VCM performance by increasing the torque constant of the VCM to achieve a corresponding decrease in data access time in seek operations in disk drives. It would also be desirable to increase the torque constant of the VCM to permit a reduction in VCM coil current to reduce $I^2R$ power losses in the system while still maintaining a given torque in the VCM.

SUMMARY OF THE INVENTION

The present invention provides an apparatus and method of supplying power to a voice coil motor (VCM) in a disk drive. A VCM power source circuit receives a standard power supply having a fixed voltage and provides a boosted voltage VCM power source having a boosted voltage greater than the fixed voltage. The boosted voltage VCM power source is supplied to the VCM. The VCM power source circuit provides the boosted voltage VCM power source independently from the voice coil motor.

In one embodiment of the present invention, a boosted voltage VCM power source supplies power to the VCM at a first time and the standard power supply supplies power to the VCM at a second time. In one embodiment, a switch switches between the boosted voltage VCM power source and the standard power supply when supplying power to the VCM during a seek operation of the disk drive.

In one embodiment, the VCM power source circuit includes a stored power source for providing the boosted voltage VCM power source. For example, a charge pump can be used to store energy in a capacitor, and the stored energy in the capacitor can then be used as the boosted voltage VCM power source by discharging the capacitor. In one embodiment, two capacitors are employed to supply boosted voltage power to the VCM. In this embodiment, the disk drive performs a seek operation and a first capacitor is discharged and a second capacitor is charged during an acceleration mode of the seek operation, and the second capacitor is discharged and the first capacitor is charged during a deceleration mode of the seek operation.

In one embodiment, the VCM power source circuit includes a regulated DC power supply for continuously providing the boosted voltage VCM power source.

A disk drive constructed according to the present invention includes a VCM power source circuit to provide a boosted voltage VCM power source to the VCM of the disk drive. This boosted VCM voltage permits the torque constant of the VCM to be increased to allow greater torque to be developed by the VCM resulting in reduced data access times during seek operations in the disk drive.

The boosted VCM voltage advantageously permits the torque constant of the VCM to be increased while allowing for a corresponding reduction in VCM coil current to reduce $I^2R$ power losses in the system while still maintaining a given torque in the VCM.

DETAILED DESCRIPTION

Figure 1:
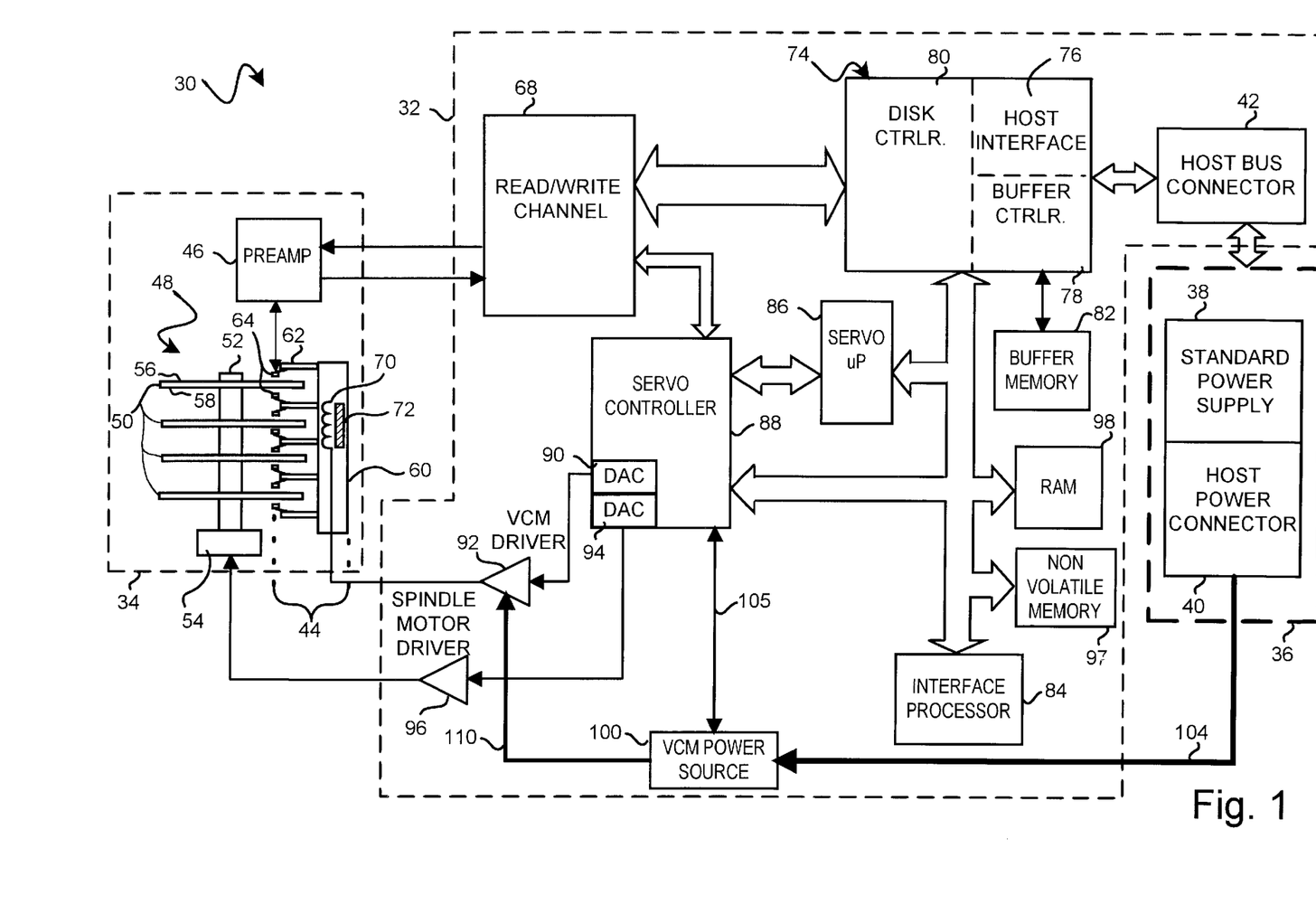
FIG. 1 is a block diagram of a hard disk drive of the invention and a corresponding host system power supply.

A hard disk drive according to the present invention is illustrated generally at 30 in FIG. 1. Disk drive 30 includes a disk controller circuit board 32 and a head disk assembly (HDA) 34. Disk controller circuit board 32 includes circuitry and processors which provide an intelligent disk control system interface between a host system 36 and HDA 34 for execution of read and write commands. Host system 36 can include a microprocessor based data processing system such as a personal computer, or other system capable of performing a sequence of logical operations. Host system 36 includes a standard power supply 38 which supplies power to disk controller circuit board 32 via a power supply connector 40. Data is transmitted between host system 36 and disk controller circuit board 32 via a host bus connector 42.

HDA 34 includes an actuator assembly 44, a preamplifier 46, and a disk assembly 48. Disk assembly 48 includes a plurality of magnetic media disks, such as indicated at 50. Disks 50 are stacked on a spindle assembly 52. Spindle assembly 52 is mechanically coupled to a spindle motor 54 for rotating disks 50 at a high rate of speed. Each disk 50 includes two disk surfaces capable of storing data thereon, such as indicated at 56 and 58. Actuator assembly 44 includes a voice coil motor (VCM) 60 and actuator arms 62 extending from VCM 60. Each actuator arm 62 corresponds to a respective disk surface such as 56 or 58. A transducer head 64 is disposed at the end of each actuator arm 62, and each transducer head 64 is associated with a disk surface 56 or 58. Transducer heads 64 communicate with disk controller circuit board 32 via preamplifier 46 for reading and writing data to the transducer head's associated disk surface. Preamplifier 46 is electrically coupled to transducer head 64 for receipt and amplification of position signals representative of the position of transducer head 64. Preamplifier 46 provides an amplified signal to a read/write channel 68 of disk controller circuit board 32. Read/write channel 68 performs encoding and decoding of data written to and read from disks 50.

VCM 60 includes a coil 70 moving in proximity to a permanent magnet 72. Actuator arms 62 are permanently coupled to VCM 60. VCM 60 swings actuator arms 62 and their corresponding transducer heads 64 back and forth over their associated disk surfaces 56 or 58 to access target data tracks formed on the associated disk surface.

Disk control circuit board 32 includes a host interface and disk controller (HIDC) integrated circuit 74. HIDC 74 includes a host interface 76, a buffer controller 78, and a disk controller 80. Host interface 76 communicates with host system 36 via host bus connector 42 by receiving commands and data from and transmitting status and data back to host system 36. Buffer controller 78 controls a buffer memory 82 employed for storing data from host system 36 which is to be written to disks 50. In addition, buffer controller 78 controls buffer memory 82 for storing read data from disks 50 to be transmitted to host system 36 via host interface 76. Buffer memory 82 typically comprises random access memory (RAM), such as dynamic random access memory (DRAM).

Disk controller 80 sends data to and receives data from read/write channel 68. Disk controller 80 also provides for error correction and error detection on data transmitted to or read from disk 50.

An interface processor 84 handles the flow of data and commands received by host interface 76 by sending commands to and reading status from disk controller 80. Interface processor 84 ascertains which commands to process from host system 36 and when to process these commands, and directs other tasks performed by disk controller 80.

A servo processor 86 commands a servo controller 88 to control the position of transducer head 64 over disk 50 at a target data track for subsequent execution of read or write commands. Servo processor 86 receives a representative form of the position signals sensed by transducer head 64 and amplified by preamplifier 46 via read/write channel 68 and servo controller 88 and performs calculations to position transducer head 64 relative to its associated disk surface. Servo processor 86 commands a digital to analog converter (DAC) 90 in servo controller 88 to provide a corresponding analog signal to a VCM driver 92. VCM driver 92 responds to the analog signal from DAC 90 to provide a corresponding current to VCM 60. More specifically, the current from VCM driver 92 is provided to coil 70 of VCM 60 and causes movement of coil 70 which in turn causes attached actuator arm 62 to swing and thereby move transducer head 64 over an associated disk surface 56 or 58 to access target data tracks.

Servo processor 86 also provides commands to servo controller 88 to control the rotational velocity of spindle motor 54. A DAC 94 in servo controller 88 provides an analog signal to a spindle motor driver 96. Spindle motor driver 96 responds to the analog signal from DAC 94 to drive and thereby control the speed of spindle motor 54. Spindle motor driver 96 also detects a back EMF of spindle motor 54 and provides a signal representative of the rotational velocity of spindle motor 54 to servo controller 88 which converts the signal into a monitored velocity signal which can be read by servo processor 86. In this way, servo processor 86 can control the rotational velocity of spindle motor 54 via servo controller 88 to maintain a substantially constant rotational velocity of rotating disks 50.

Disk system operational programs are stored in nonvolatile memory 97, such as read-only memory (ROM) or flash memory, and are loaded into RAM 98 for execution. Alternatively, portions of disk system operational programs are stored on reserve cylinders on disk 50. Suitably, servo processor 86 may have integrated or separate memory (not shown) for storage of servo programs.

The current track position of transducer head 64 is stored by servo processor 86 to determine a required seek distance between the current data track and a target data track. Based on the required seek distance, servo processor 86 retrieves a corresponding read or write seek profile and provides a digital signal command to DAC 90 corresponding to the seek profile. The profile determines the performance of a seek operation and is highly dependent on the VCM dynamics, i.e. torque constant $K_t$ and applied current $I_{coil}$ discussed above. DAC 90 provides a corresponding analog signal to VCM driver 92 representative of the seek profiles. VCM driver 92 provides a current output to coil 70 of VCM 60 for acceleration and/or deceleration of actuator arm 62 to perform a seek operation to move transducer head 64 from the current data track to the target data track. As actuator arm 62 moves from the current data track to the target data track, position information is received through the sensing of servo wedges disposed on disk surface 56 or 58. Based on this position information, a position error signal is provided via preamplifier 46, read/write channel 68, and servo controller 88 to servo processor 86 to provide a representative position of transducer head 64 relative to its associated disk surface 56 or 58. Upon completion of a seek operation and the corresponding alignment of transducer head 64 over the target data track, a read or write command is executed to read data from or write data to the target data track.

VCM Boosted Power Source

According to the present invention, hard disk drive 30 includes a VCM power source circuit 100. VCM power source circuit 100 receives a regulated 12 volt power source 104 from standard power supply 38 of host system 36 via power supply connector 40. VCM power source 100 supplies boosted power on a power line 110 to VCM driver 92 which drives VCM 60. VCM power source 100 supplies power independently of VCM 60. In other words, the back EMF generated in VCM coil 70 is not employed by VCM power source circuit 100.

VCM power source circuit 100 provides additional voltage to VCM 60 at least during seek operations. In one embodiment, VCM power source circuit 100 is controlled by servo controller 88 via a line 105 to provide the boosted power source as the VCM power source on line 110 only during seek operations. This increased voltage to VCM 60 significantly reduces access time during seek operations in disk drive 30 as compared to a conventional disk drive without VCM power source circuit 100.

Figure 2:
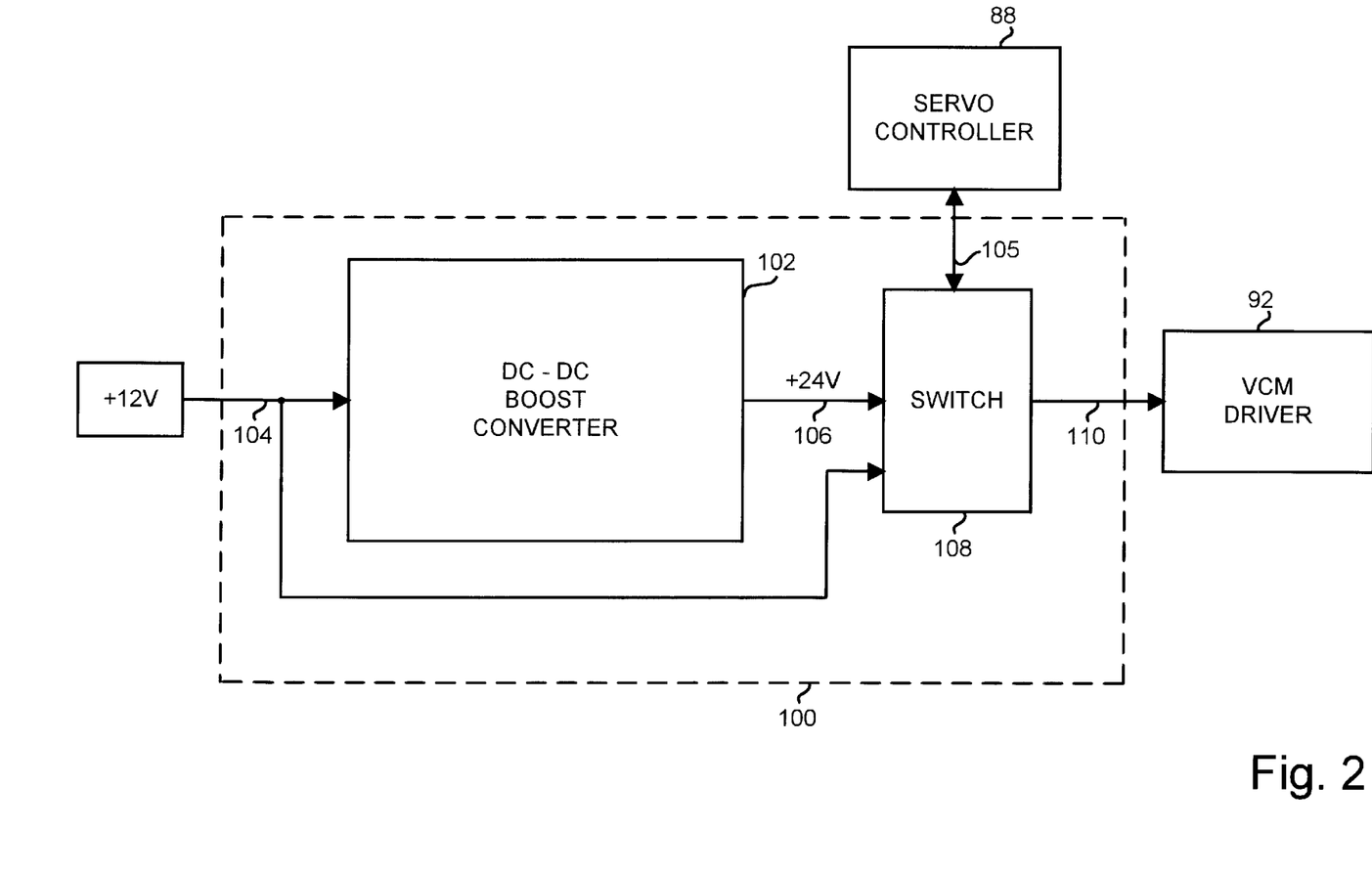
FIG. 2 is a block diagram of a DC to DC boost converter to be employed as a VCM power source for the hard disk drive of FIG. 1.

One embodiment of a VCM power source circuit 100 according to the present invention is a continuous regulated voltage supply circuit, such as a DC to DC boost converter 102 illustrated in FIG. 2. DC to DC boost converter 102 receives a standard power source on input power line 104 and provides a regulated boosted voltage power source on a power line 106. In one exemplary embodiment, DC to DC boost converter 102 receives a standard power source of approximately 12 volts on line 104 and provides a boosted 24 volts on line 106. DC to DC boost converter 102 needs to produce a sufficient amount of current to perform seek operations at the boosted voltage. If the VCM characteristics were held constant, doubling the VCM voltage from 12 volts to 24 volts would allow twice the current to be applied to the VCM for performing seek operations than that of the normal standard 12 volt power source. However as noted above, the higher voltage enables the VCM torque constant to be modified, thereby reducing system power losses. In this example embodiment, the doubling of the power source to VCM driver 92 provides on average approximately a 15 to 20 percent reduction in seek times, with an even more significant reduction during short seeks.

Suitably, DC to DC boost converter 102 provides load current requirements of approximately 2A continuous and 4A transient. Suitably, DC to DC boost converter 102 is implemented as a switching boost regulator and produces an output voltage ripple of less than 100 mV peak to peak.

In the embodiment of the VCM power source circuit illustrated in FIG. 2, a switch 108 receives the boosted power source on line 106 and the standard power source on line 104 and provides the VCM power source on power line 110 to VCM driver 92. In one embodiment, switch 108 is controlled by servo controller 88 via line 105 to provide the boosted power source on line 106 as the VCM power source on line 110 only during seek operations.

Figure 3:
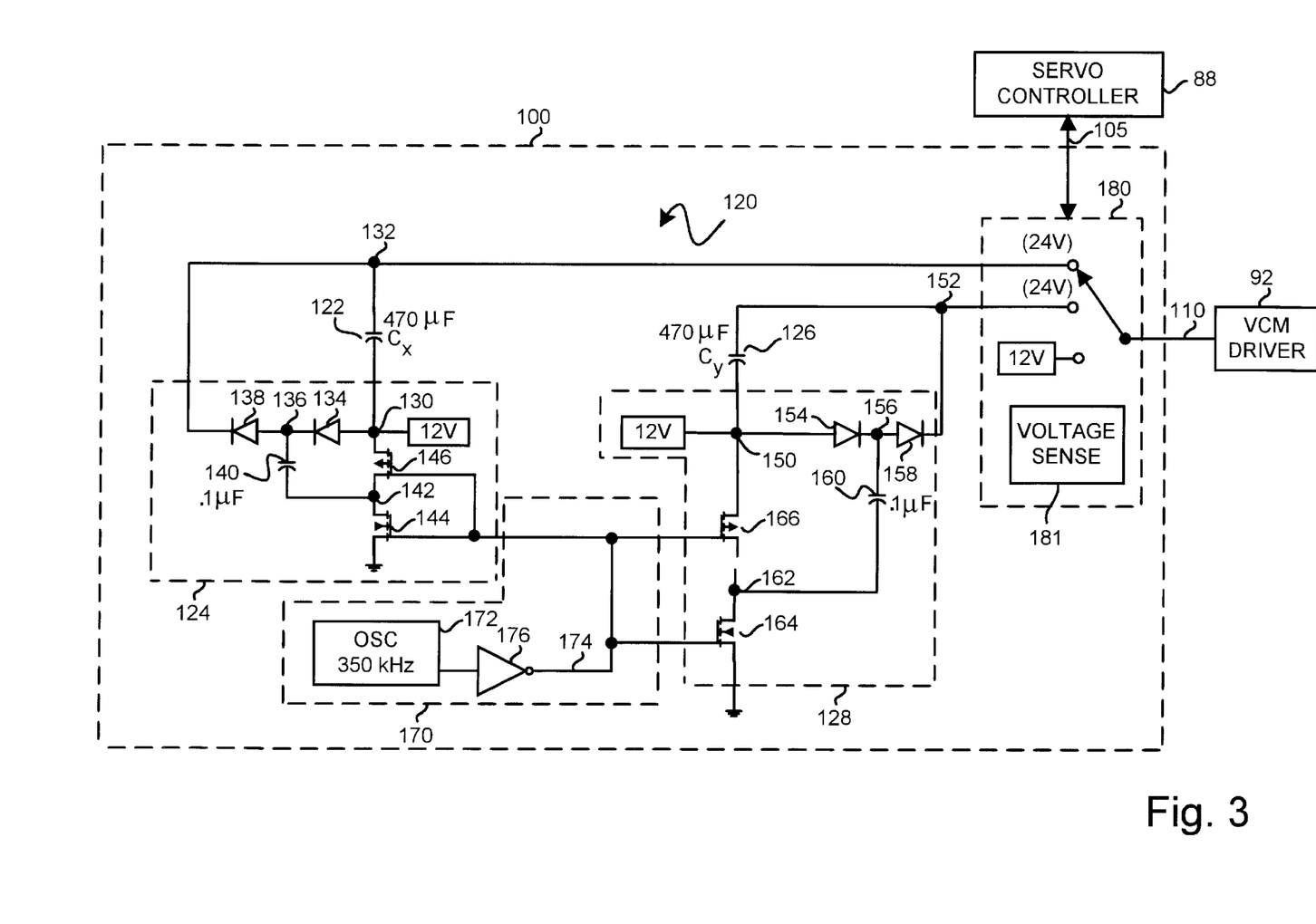
FIG. 3 is a schematic and block diagram of charge pump circuitry to be employed as a VCM power source of the hard disk drive of FIG. 1.

Another embodiment of a VCM power source circuit 100 according to the present invention includes a charge pump, such as charge pump circuitry 120 illustrated in FIG. 3. Charge pump circuitry 120 includes an acceleration boost capacitor 122 which is charged by a charge pump 124, and a deceleration boost capacitor 126 which is charged by a charge pump 128. Boost capacitors 122 and 126 store energy to be used during seek operations by VCM 60. By utilizing the boosted voltage from boost capacitors 122 and 126 as described below, the voltage rise time in coil 70 of VCM 60 is significantly reduced. Access time during seek operations are significantly reduced, with short seeks having the most significant performance boost.

Charge pump circuitry 120 employs two boost capacitors 122 and 126 to permit one boost capacitor to recharge while the other one is discharging. During a seek operation, acceleration boost capacitor 122 is employed to supply current to VCM driver 92 and thereby to VCM 60 during an acceleration phase of the seek operation. During the acceleration phase, deceleration boost capacitor 126 is charged by charge pump 128. Similarly, deceleration boost capacitor 126 is employed to supply current to VCM 60 during a deceleration phase of the seek operation. During the deceleration phase, acceleration boost capacitor 122 is recharged by charge pump 124.

Charge pump circuitry 120 of FIG. 3 is coupled as follows. Acceleration boost capacitor 122 is coupled between a standard power supply node 130 and a boosted voltage supply node 132. For example, in one embodiment, standard power supply node 130 is set at 12 volts and acceleration boost capacitor 122 is charged to provide a maximum boosted voltage on node 132 of 24 volts. A diode 134 is coupled between node 130 and a node 136. A diode 138 is coupled between node 136 and node 132. A pump capacitor 140 is coupled between node 136 and a node 142. Charge pump circuits 124 and 128 employ both P channel field effect transistors (P-FET) and N channel field effect transistors (N-FET). For example, N-FET 144 is coupled between node 142 and ground while P-FET 146 is coupled between node 142 and node 130.

Deceleration boost capacitor 126 is coupled between a standard power supply node 150 and a boosted voltage supply node 152. For example, in one embodiment, standard power supply node 150 is set at 12 volts and deceleration boost capacitor 126 is charged to provide a maximum boosted voltage on node 152 of 24 volts. A diode 154 is coupled between node 150 and a node 156. A diode 158 is coupled between node 156 and node 152. A pump capacitor 160 is coupled between node 156 and a node 162. N-FET 164 is coupled between node 162 and ground. P-FET 166 is coupled between node 162 and node 150.

A clocking circuit 170 includes an oscillator 172 which provides an oscillating pulse signal to an inverter/driver 176. Inverter 176 provides a switched 12V signal at the oscillator frequency on a line 174 in common to the gates of complementary paired P-FET 146, N-FET 144, and complementary paired P-FET 166, N-FET 164. In this way, oscillating signal line 174 acts to control the gates of N-FET 144 and P-FET 146 to operate charge pump 124 and the gates of N-FET 164 and P-FET 166 to operate charge pump 128.

The charging operation of charge pump 124 to charge acceleration boost capacitor 122 is as follows. When oscillating signal line 174 controls the gate of N-FET 144 to turn on N-FET 144, P-FET 146 is turned off. If node 130 is greater than or equal to node 136, then diode 134 conducts. Therefore, with N-FET 144 on and P-FET 146 off, node 136 is equal to the potential of node 130, which is equal to 12 volts. Since node 142 is brought to a ground potential with N-FET 144 on, pump capacitor 140 is charged towards 12 volts. When oscillating signal line 174 switches N-FET 144 off and P-FET 146 on, node 130 is still equal to 12 volts. With P-FET 146 on node 130 is coupled to node 142, and node 142 is brought to 12 volts. Node 136 is brought approximately 12 volts higher than node 142 due to the charge on capacitor 140. Thus, node 136 is brought towards 24 volts. With node 130 less than node 136, diode 134 no longer conducts. On the other hand, with node 136 equal to approximately 24 volts, diode 138 conducts to bring node 132 to approximately 24 volts to charge acceleration boost capacitor 122 to approximately 12 volts above the standard power supply of 12 volts on node 130 (i.e., node 132 is raised to approximately 24 volts).

The charging operation of charge pump 128 to charge acceleration boost capacitor 126 is as follows. When oscillating signal line 174 controls the gate of N-FET 164 to turn on N-FET 164, P-PET 166 is turned off. If node 150 is greater than or equal to node 156, then diode 154 conducts. Therefore, with N-FET 164 on and P-FET 166 off, node 156 is equal to the potential of node 150, which is equal to 12 volts. Since node 162 is brought to a ground potential with N-FET 164 on, pump capacitor 160 is charged towards 12 volts. When clocking circuit 170 switches N-FET 164 off and P-FET 166 on, node 150 is still equal to 12 volts. With P-FET 166 on node 150 is coupled to node 162, and node 162 is brought to 12 volts. Node 156 is brought approximately 12 volts higher than node 162 due to the charge on capacitor 160. Thus, node 156 is brought towards 24 volts. With node 150 less than node 166, diode 154 no longer conducts. On the other hand, with node 156 equal to approximately 24 volts, diode 158 conducts to bring node 152 to approximately 24 volts to charge acceleration boost capacitor 126 to approximately 12 volts above the standard power supply of 12 volts on node 150 (i.e., node 152 is raised to approximately 24 volts).

Charge pump circuitry 120 includes a switch 180 to switch between the acceleration boost voltage on node 132, the deceleration boost voltage on node 152, and the standard 12 volt supply. In one embodiment, a voltage sensing circuit 181 detects the available voltage on acceleration boost capacitor 122 and deceleration boost capacitor 126 and enables servo processor 86 to control switch 180 through servo controller 88 with a combination of software routines defining a seek profile and the level of available voltage sensed by voltage sensing circuit 181.

Figure 4:
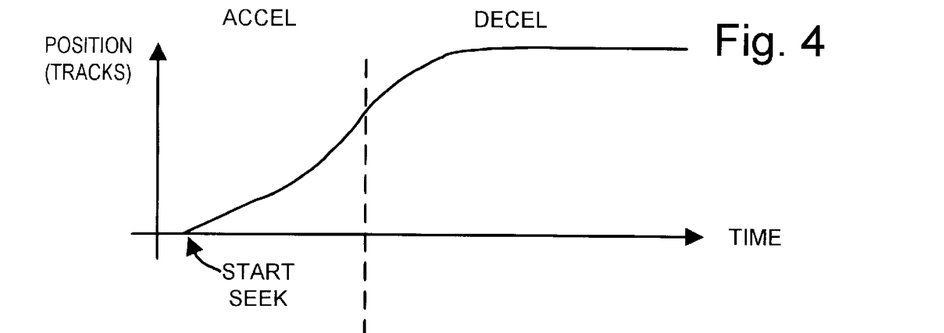
FIG. 4 is a timing diagram illustrating position in track number versus time through an acceleration and deceleration phase of a seek operation performed by the disk drive of the present invention.
Figure 5:
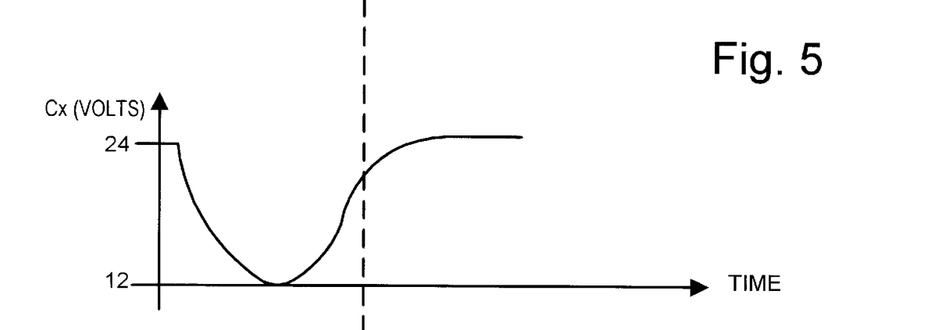
FIG. 5 is a timing diagram illustrating acceleration boost capacitor voltage versus time through an acceleration and deceleration phase of a seek operation of a disk drive according to the present invention.
Figure 6:
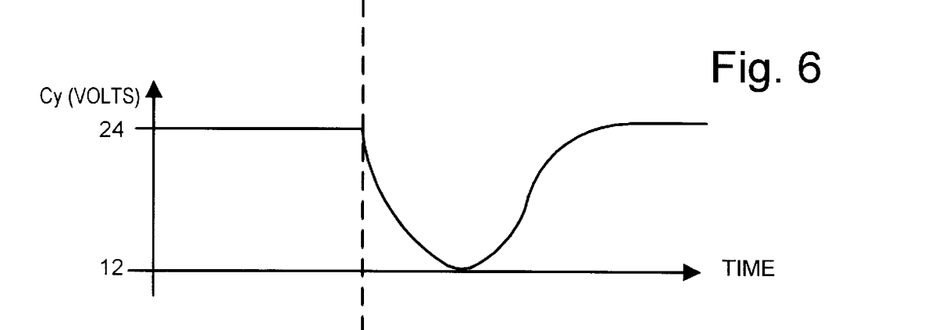
FIG. 6 is a timing diagram illustrating deceleration boost capacitor voltage versus time through an acceleration and deceleration phase of a seek operation of a disk drive according to the present invention.
Figure 7:
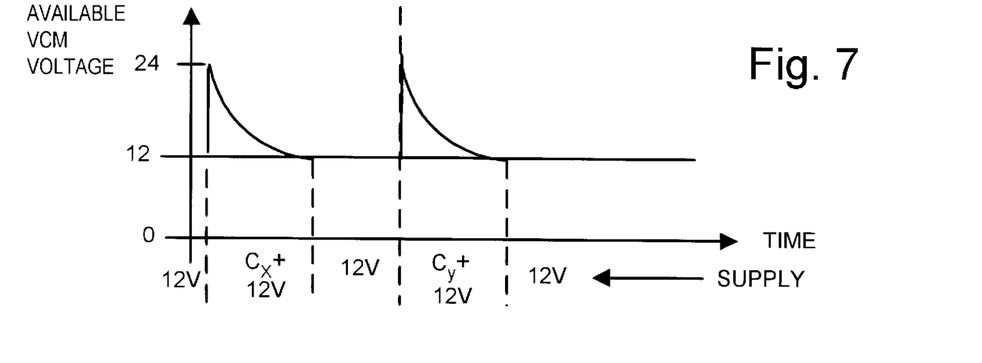
FIG. 7 is a timing diagram illustrating available VCM voltage versus time through an acceleration and deceleration phase of a seek operation of a disk drive according to the present invention.

The operation of switch 180 is illustrated in timing diagram form in FIGS. 4–7 for a typical seek operation which includes an acceleration phase and a deceleration phase. In FIG. 4, the position of transducer head 64 over disk 50 as indicated by data track number is plotted versus time. In FIG. 5, the voltage of acceleration boost capacitor 122 is plotted versus time. In FIG. 6, the voltage of deceleration boost capacitor 126 is plotted versus time. In FIG. 7, available VCM voltage provided on line 110 is plotted versus time. As illustrated in FIGS. 4–7, when acceleration boost capacitor 122 is employed as the VCM power source, acceleration boost capacitor 122 gradually discharges, and can fully discharge during long seek operations. When acceleration boost capacitor 122 discharges to the point where it no longer provides an advantage over the standard 12 volt power supply, switch 180 switches to the standard 12 volt power supply. As illustrated in FIGS. 4–7, when the deceleration phase of the seek operation begins, deceleration boost capacitor 126 is fully charged and switch 180 switches to node 152 to use the fully charged 24-volts from capacitor 126. When the voltage on deceleration boost capacitor 126 drops below the point where it provides a power advantage over the standard 12 volt power supply, switch 180 switches to the standard 12 volt power supply.

Since acceleration boost capacitors 122 and 126 provide a temporary power source, the boost capacitors cannot maintain a large supply of additional energy. Nevertheless, boost capacitors 122 and 126 provide a significant performance improvement in access time for seek operations, and especially for short seek operations, because during short seek operations the charge on boost capacitors 122 and 126 is effective throughout the seek. Presently implemented command re-ordering algorithms employ numerous short seek operations, which can greatly benefit from the boosted VCM power source from boost capacitors 122 and 126. The access time is reduced because the boosted voltage from boost capacitors 122 and 126 permit a higher torque constant to be used in VCM 60 than can be used by a VCM receiving a standard 12 volt power supply. The increased torque constant of VCM 60 allows greater torque to be developed by VCM 60, which reduces access time.

In addition, the increased torque constant in VCM 60 permitted as a direct result of the boosted voltage from boost capacitors 122 and 126 can alleviate heat related breakdown of components of VCM 60 by not requiring as much current to pass through coil 70 to achieve an equivalent amount of torque in VCM 60. In addition, a significant improvement in coil current rise time is obtained with boosted voltages to VCM 60. Moreover, switching time between the acceleration phase and the deceleration phase of the seek operation is also reduced by utilizing the boosted VCM voltages.

Figure 8:
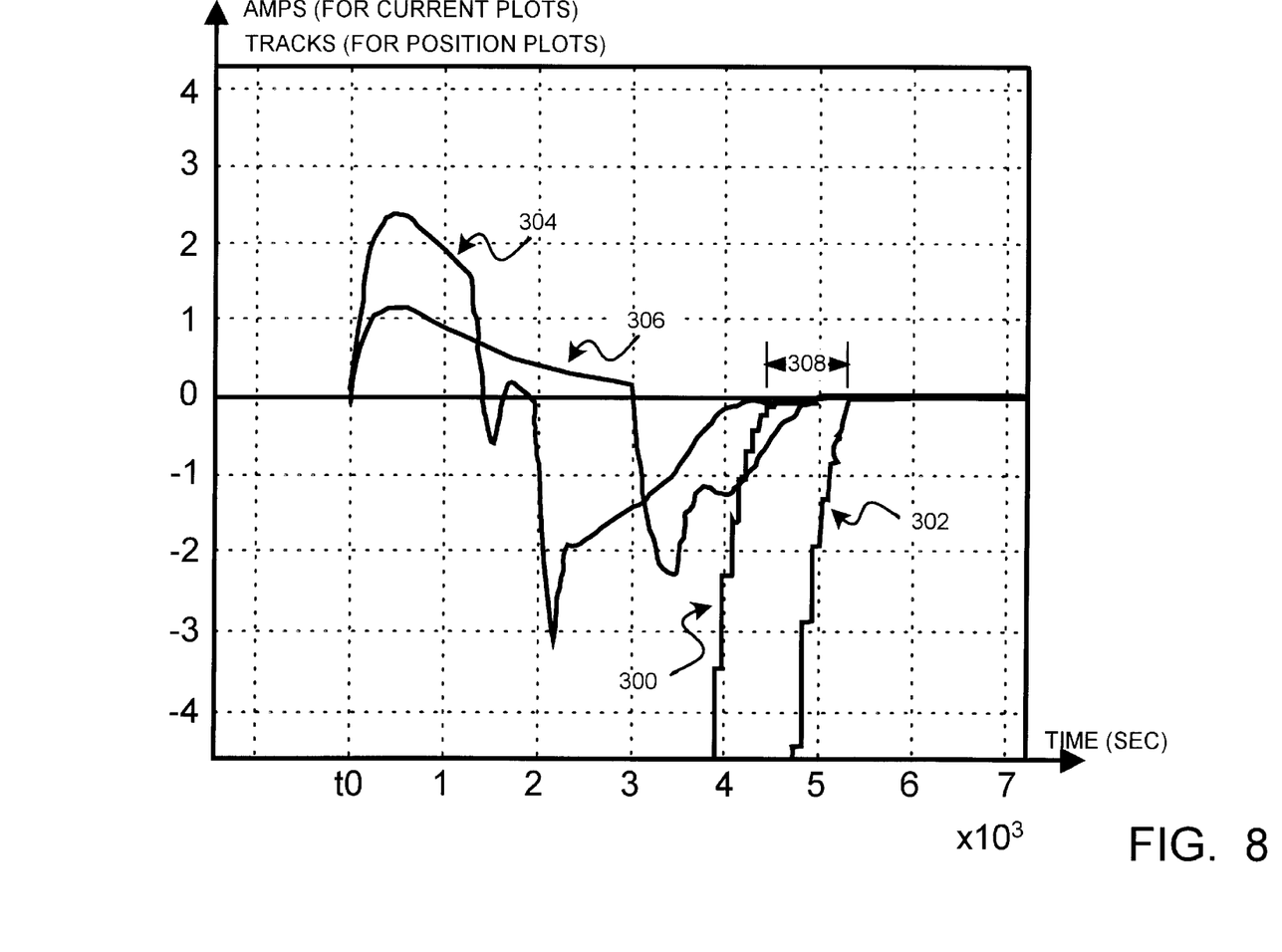
FIG. 8 is a graphical diagram illustrating track position and VCM coil current versus time for a 12 volt standard power supply and a 24 volt VCM power source according to the present invention.

Simulation results for a VCM using a 12 volt standard power supply and for using a 24 volt VCM power source according to the present invention from a somewhat idealized model of a seek operation in a disk drive are illustrated graphically in FIG. 8. FIG. 8 plots track position and VCM coil current versus time with a constant Kt for both cases of the motor. For reasons discussed above, a practical implementation would use a motor having increased Kt to provide improved torque without suffering heating effects from higher current. In the seek operation modeled in FIG. 8, a transducer head moves from a current data track to a target data track during a seek traversing approximately one-third of the actuator stroke.

A curve 300 plots track position directly preceding arrival at the target track for a VCM receiving the 24 volt VCM power source during the deceleration phase of the model seek operation. Comparably, a curve 302 plots track position preceding arrival at the target track for a VCM receiving the 12 volt standard power supply during the deceleration phase of the model seek operation. A curve 304 plots VCM coil current for the VCM receiving the 24 volt VCM power source during the model seek operation including acceleration and deceleration phases. A curve 306 comparably plots VCM coil current for the VCM receiving the 12 volt standard power supply during the model seek operation.

As illustrated in FIG. 8, the coil current rise time is significantly reduced by using the 24 volt VCM power source according to the present invention during the model seek operation instead of the 12 volt standard power supply. Also, as indicated by interval 308, there is an approximate 20 percent reduction in the total model seek time with the 24 volt VCM power source according to the present invention.

Another embodiment of the present invention (not shown) utilizes a single boost capacitor rather than a separate acceleration boost capacitor and a separate deceleration boost capacitor. If the single boost capacitor stores sufficient power, it can be used for the entire seek operation, such as during short seek operations. Even if there is not sufficient power stored in the single capacitor, the single capacitor embodiment can use the boosted voltage during the switching points starting the acceleration and deceleration phases of the seek operation to improve rise time in coil 70 of VCM 60.

Figure 9:
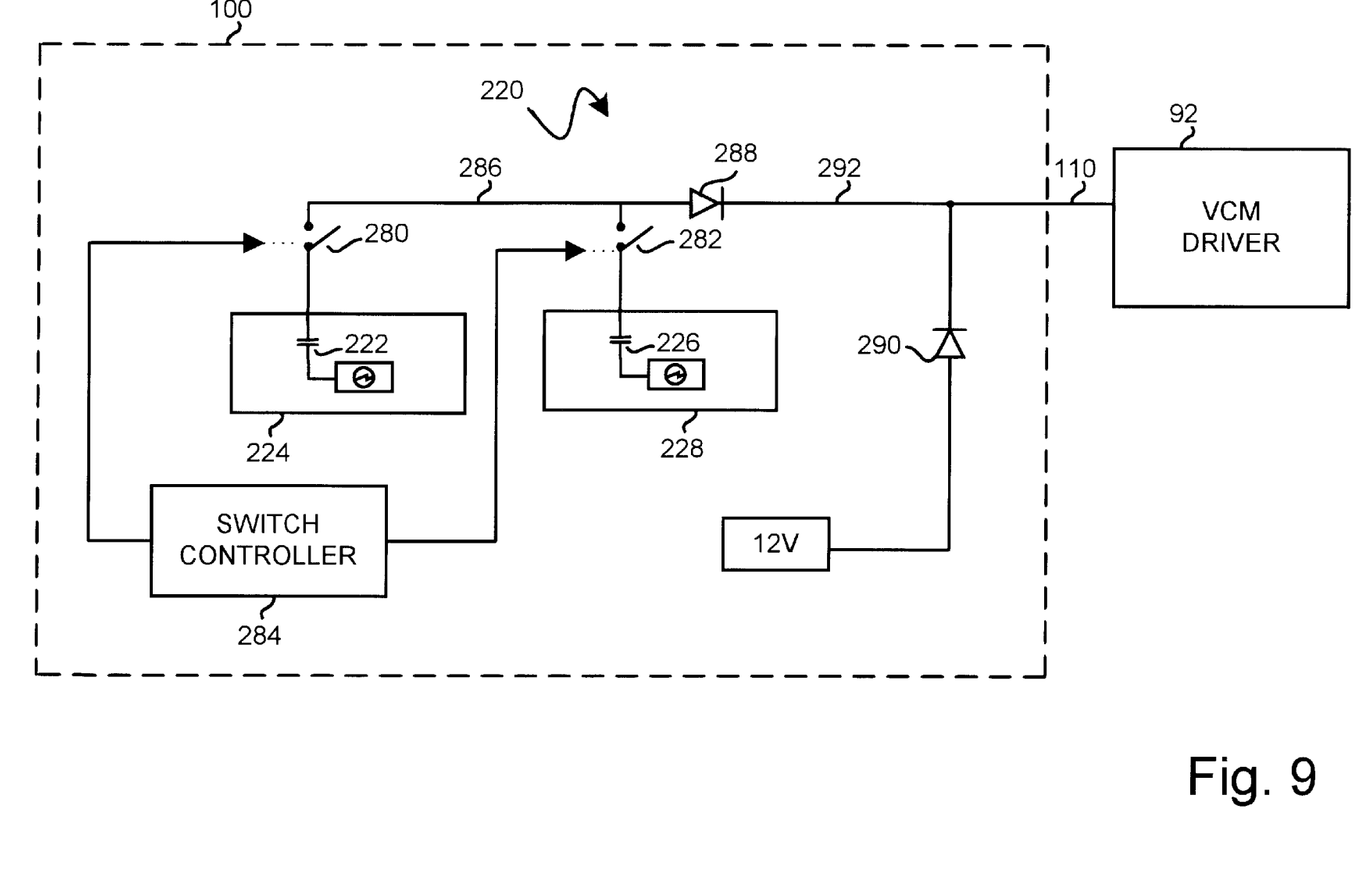
FIG. 9 is a schematic and block diagram of an alternative embodiment of charge pump circuitry to be employed as a VCM power source of the hard disk drive of FIG. 1.

An alternative embodiment for a VCM power source 100 according to the present invention is charge pump circuitry 220 illustrated in FIG. 9. Charge pump circuitry 220 includes a charge pump 224 which charges an acceleration boost capacitor 222 and a charge pump 228 which charges a deceleration boost capacitor 226. A switch 280 is coupled between acceleration boost capacitor 222 and a node 286. A switch 282 is coupled between deceleration boost capacitor 226 and node 286. A switch controller circuit 284 controls switches 280 and 282, such that during the acceleration phase of a seek operation, switch 280 is closed to couple voltage from acceleration boost capacitor 222 to node 286. Also during the acceleration phase, switch 282 is open to decouple deceleration boost capacitor 226 from node 286. During a deceleration phase of a seek operation, switch 282 is closed to couple deceleration boost capacitor 226 to node 286 and switch 280 is open to decouple acceleration boost capacitor 222 from node 286. A diode 288 is coupled between node 286 and a node 292. Node 292 is coupled to VCM driver 92 via line 110 and supplies the VCM power source to VCM driver 92. A diode 290 is coupled between the standard 12-volt supply and node 292.

In the operation of charge pump circuitry 220, during either the acceleration phase or deceleration phase of a seek operation if node 286 is greater than 12 volts (e.g., 12–24 volts) diode 288 conducts, and diode 290 is off. Once the switched in boost capacitor 222 or 226 discharges to 12 volts, diode 288 no longer conducts and diode 290 conducts to couple the standard 12 volt power supply to node 292. In this way, charge pump circuitry 220 utilizes diodes 288 and 290 instead of servo controller 88 and servo processor 86 to control the switching of the VCM power source from the boosted capacitor voltage on node 286 to the standard 12 volt power supply during seek operations.

What is claimed:

1. A method of supplying power to a voice coil motor in a disk drive which performs a seek operation, the method comprising the steps of:

receiving a first power source from a standard power supply having a fixed voltage;

boosting the fixed voltage of the first power source to produce a second power source having a first boosted voltage greater than the fixed voltage;

boosting the fixed voltage of the first power source to produce a third power source having a second boosted voltage greater than the fixed voltage, wherein the boosting steps are performed independently from the voice coil motor;

supplying the second power source to the voice coil motor during a first phase of the seek operation; and supplying the third power source to the voice coil motor during a second phase of the seek operation.

2. The method of claim 1 wherein the second power source is supplied to the voice coil motor at a first time and the method further comprises the step of:

supplying the first power source to the voice coil motor at a second time.

3. The method of claim 1 further comprising the step of:

switching between the first and second power sources when supplying power to the voice coil motor during the seek operation.

4. The method of claim 1 further comprising the step of:

providing the first boosted voltage of the second power source with a stored power source.

5. The method of claim 1 further comprising the step of:

providing the first boosted voltage of the second power source with a regulated DC power supply which continuously supplies power.

6. The method of claim 1 wherein the boosting step comprises the step of:

charging a capacitor.

7. The method of claim 6 wherein the charging step comprises the step of:

charging the capacitor with a charge pump.

8. The method of claim 6 wherein the supplying step comprises the step of:

discharging the capacitor.

9. The method of claim 1 wherein the supplying steps include the steps of:

supplying the second power source to the voice coil motor during an acceleration mode of the seek operation; and supplying the third power source to the voice coil motor during a deceleration mode of the seek operation.

10. The method of claim 9 further comprising the steps of:

switching between the first and second power sources when supplying power to the voice coil motor during the acceleration mode of the seek operation; and switching between the first and third power sources when supplying power to the voice coil motor during the deceleration mode of the seek operation.

11. The method of claim 1 wherein boosting steps include the steps of:

charging a first capacitor for supplying the first boosted voltage; and charging a second capacitor for supplying the second boosted voltage.

12. The method of claim 11 wherein the supplying steps include the steps of:

discharging the first capacitor to supply the first boosted voltage; and discharging the second capacitor to supply the second boosted voltage.

13. The method of claim 12 wherein the first capacitor is discharged and the second capacitor is charged during an acceleration mode of the seek operation and wherein the second capacitor is discharged and the first capacitor is charged during a deceleration mode of the seek operation.

14. A disk drive connectable to a standard power supply having a fixed voltage, the disk drive comprising:

an actuator assembly having a voice coil motor; and a servo controller for commanding the actuator assembly to perform a seek from a current track position to a target track position; and a circuit board including:
  a power supply connector for connecting to the standard power supply, and
  a power source circuit coupled to the power supply connector and providing a first boosted voltage power source having a first boosted voltage greater than the fixed voltage, and providing a second boosted voltage power source having a second boosted voltage greater than the fixed voltage, wherein the first and second boosted voltage power sources are provided independently from the voice coil motor, wherein the power source circuit supplies the first boosted voltage power source to the voice coil motor during a first phase of the seek operation and the power source circuit supplies the second boosted voltage power source to the voice coil motor during a second phase of the seek operation.

15. The disk drive of claim 14 wherein the circuit board supplies the first boosted voltage power source to the voice coil motor during a first time interval and the circuit board supplies the standard power supply to the voice coil motor during a second time interval.

16. The disk drive of claim 14 wherein the disk drive further comprises:

a switch for switching between the first boosted voltage power source and the standard power supply when the circuit board supplies power to the voice coil motor during the seek.

17. The disk drive of claim 14 wherein the power source circuit includes a stored power source for providing the first boosted voltage power source.

18. The disk drive of claim 14 wherein the power source circuit includes a regulated DC power supply for continuously providing the first boosted voltage power source.

19. The disk drive of claim 14 wherein the power source circuit includes a capacitor storing the first boosted voltage and being discharged to supply the voice coil motor with the first boosted voltage power source.

20. The disk drive of claim 19 wherein the power source circuit includes a charge pump to charge the capacitor.

21. The disk drive of claim 14 wherein the circuit board supplies the first boosted voltage power source to the voice coil motor during an acceleration mode of the seek and supplies the second boosted voltage power source to the voice coil motor during a deceleration mode of the seek.

22. The disk drive of claim 21 further comprising:

a switch for switching between the first boosted voltage power source and the standard power supply when the circuit board supplies power to the voice coil motor during the acceleration mode of the seek and for switching between the second boosted voltage power source and the standard power supply when the circuit board supplies power to the voice coil motor during the deceleration mode of the seek.

23. The disk drive of claim 14 further comprising:

a first capacitor for supplying the first boosted voltage power source; and a second capacitor for supplying the second boosted voltage power source.

24. The disk drive of claim 23 wherein the power source circuit discharges the first capacitor and charges the second capacitor during an acceleration mode of the seek and wherein the power source circuit discharges the second capacitor and charges the first capacitor during a deceleration mode of the seek.

* * * * *